United States Patent [19]

Saeki et al.

[11] 3,819,957

[45] June 25, 1974

[54] TWO CHANNEL BALANCE CONTROL DEVICE

[75] Inventors: Yoshifumi Saeki, Tokyo; Saburo Takaoka, Kanagawa, both of Japan

[73] Assignee: Pioneer Electronic Corporation, Tokyo, Japan

[22] Filed: July 27, 1972

[21] Appl. No.: 275,669

[30] Foreign Application Priority Data

July 27, 1971 Japan ................................ 46-56274

[52] U.S. Cl. ................. 307/264, 307/237, 307/240, 328/171, 330/145

[51] Int. Cl. ............................................ H03k 1/14

[58] Field of Search .................... 307/237, 240, 264; 330/145; 328/168, 169, 171, 172

[56] References Cited

UNITED STATES PATENTS 3,549,903 12/1970 Lowdenslager ..................... 307/237

3,564,394 2/1971 Opal et al. ...................... 307/240 X 3,701,059 10/1972 Nyswander ...................... 330/35 X

*Primary Examiner*—John Zazworsky

*Attorney, Agent, or Firm*—Sughrue, Rothwell, Mion, Zinn & Macpeak

[57] ABSTRACT

A signal level control device for varying the level of an input signal through the variation of a variable resistor. A switching circuit is turned ON for a period of time determined by the resistance of the variable resistor. The input signal is gated through the switching circuit during the ON time of the switching circuit. The output of the switching circuit is applied to a low pass filter which filters out the high frequency components due to the switching such that the output of the filter circuit is a signal having the same wave shape as the input signal and an amplitude proportional to the ON time of the switching circuit. By adjusting the variable resistor the ON time of the switching circuit is varied and thus the amplitude of the output signal is varied.

1 Claim, 16 Drawing Figures

TWO CHANNEL BALANCE CONTROL DEVICE

BACKGROUND OF THE INVENTION

1. Field of the Invention

This invention relates to a signal level control device used in regulating sound volume and quality, and balance conditions in sound systems such as radios and television sets, etc.

2. Description of the Prior Art

Conventional systems for regulating a signal in terms of sound volume, for example, are characterized in that a slider or rotary type variable resistor, or a switchable variable resistor is provided in a signal transfer path wherein the division ratio of a signal voltage is changed by means of variation of the resistor to regulate the sound volume. In devices employing such a conventional system as above, because a variable resistor is inserted in the signal transfer path, noise, caused by the variable resistor mixes directly with a signal so that the noise is reproduced simultaneously with the signal.

SUMMARY OF THE INVENTION

It is the primary object of the present invention to provide a signal level control device designed in a manner that it does not directly regulate a signal by means of a variable resistor so that noise, generated by the variable resistor, has no effect on the signal.

It is another object of the present invention to provide a signal level control device which can control, simultaneously, a plurality of signals through adjustment of one variable resistor.

It is a further object of the present invention to provide a signal level control device which may be modified to generate square wave signals mutually out of phase to control two signals to thereby achieve balance control of the two signals.

It is a still further object of the present invention to provide a signal level control device, which transmits through a transmitter, a control signal modulated by a square wave signal and utilizes an amplifier device, including a receiver, for receiving the transmitted signal to thereby achieve cordless remote control.

The present invention resides in a signal level control device which comprises a switching means coupled in a signal transfer path adapted to be controlled by a control signal having a frequency higher than the frequency of an input signal. A control signal adjusting means adjusts the pulse width of the control signal to vary the ON time of a switching means through which the input signal passes and a filter means filters the input signal chopped by the switching means to provide an output signal having a waveform the same as the waveform of the input signal and an amplitude proportional to the ON time.

DESCRIPTION OF THE PREFERRED EMBODIMENTS

Figures 1, 2:
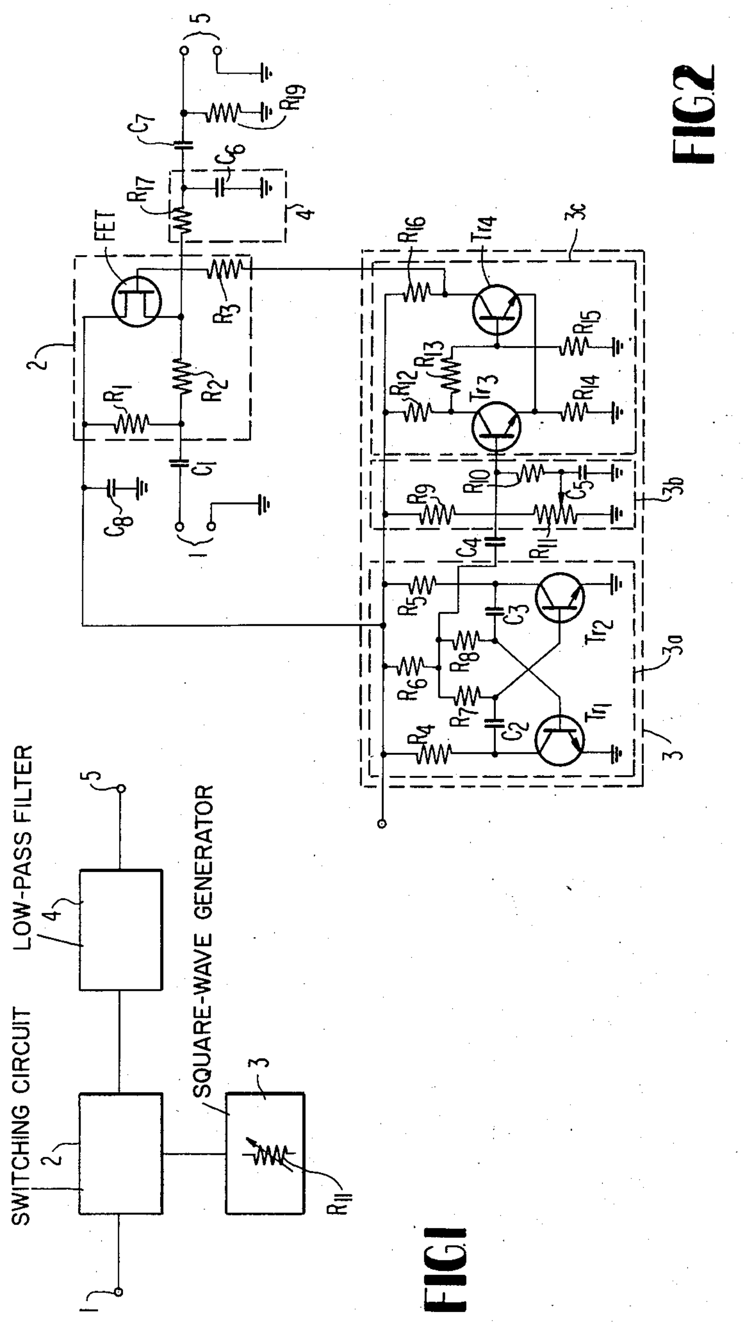
FIG. 1 is a block diagram of a basic circuit arrangement.
FIG. 2 is a detailed circuit diagram of the basic circuit arrangement of the present invention.

With reference to FIGS. 1 and 2 of the drawings, 1 is an input terminal which may, for example, be connected to an output terminal of an intermediate-frequency amplifier and 2 is a switching circuit which is connected through a coupling capacitor $C_1$ to the input terminal 1. The switching circuit comprises resistors $R_1$, $R_2$ and $R_3$ and a field effect transistor FET. 3 is a square wave generating circuit for generating a square wave signal to control the switching circuit 2. Square wave generator 3 comprises a sawtooth signal oscillator 3a, a pulse width regulating circuit 3b and a Schmitt trigger circuit 3c. Sawtooth oscillator circuit 3a is a modification of an astable multivibrator circuit and includes resistors $R_4$ to $R_8$, capacitors $C_2$ and $C_3$ and transistors $Tr_1$ and $Tr_2$. Pulse width regulating circuit 3b, connected through a coupling capacitor $C_4$ to the sawtooth signal oscillator 3a, includes resistors $R_9$ and $R_{10}$, a variable resistor $R_{11}$, and a capacitor $C_5$. Schmitt trigger circuit 3c includes resistors $R_{12}$ to $R_{16}$, and transistors $Tr_3$ and $Tr_4$. Filter 4 is a low-pass filter for removing high frequency components of the square wave from the output signal of switching circuit 2. Filter 4 includes a resistor $R_{17}$ and a capacitor $C_6$. 5 is an output terminal connected through a capacitor $C_7$ to the low-pass filter 4, which may be connected to an input terminal of a low frequency amplifier (not shown). It will be seen that resistor $R_{19}$ is connected between the output terminal 5 and ground, and capacitor $C_8$ is connected between the drain electrode of the field effect transistor FET and ground.

In operation, a sawtooth signal of a certain frequency is generated by the sawtooth signal oscillator *3a*. A d.c. voltage is superimposed on the sawtooth signal in the pulse width regulating circuit *3b*, then, the resulting signal is applied to the Schmitt trigger circuit *3c*. The signal is shaped in the Schmitt trigger circuit *3c* to become a square wave signal. If the variable resistor $R_{11}$ of the pulse width regulating circuit *3b* is changed, the pulse width of the square wave signal from the Schmitt trigger circuit 3c can be varied over a range of 0 to 100 percent.

When the positive portion of the square wave signal is supplied from the square wave generating circuit 3 to the gate of the field effect transistor FET, the channel resistance between the drain and source electrodes decreases to produce an ON-state. If the negative portion of the square wave signal is applied to the gate, the channel resistance between the drain and source electrodes increases to produce an OFF-state. Accordingly, the signal transfer path can thus be opened or closed. The signal fed to the signal transfer path is thereby chopped and then applied to the succeeding stage, i.e., the low-pass filter 4.

Figure 3:
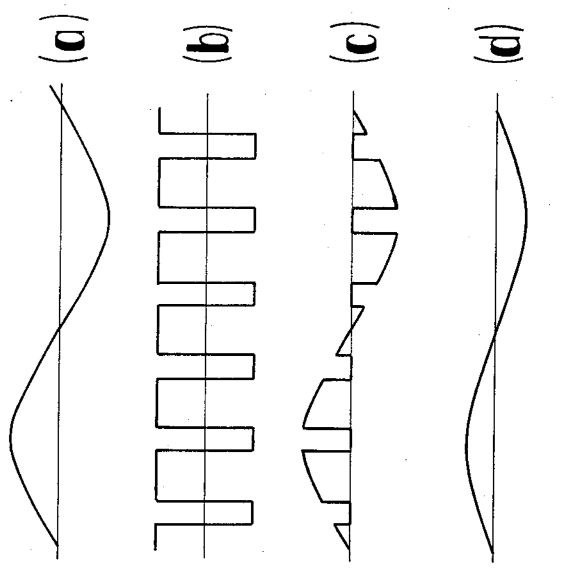
FIGS. 3A–D are signal waveform diagram relating to FIG. 2.

If a signal having a waveform such as is shown in FIG. 3A is applied to the input terminal 1, it will be applied to the switching circuit 2. If a square wave signal as shown in FIG. 3B, from the square wave generating circuit 3, is applied to the switching circuit 2, the input signal of FIG. 3A is chopped in accordance with the square wave signal. As a result the output of the switching circuit 2 is a signal as shown in FIG. 3C which has an intermittent waveform depending upon the pulse width of the square wave signal. This output signal in FIG. 3C is applied to the low-pass filter 4 whereby the frequency components of the square wave are removed. Thus, the low-pass filter 4 provides at its output a signal as shown in FIG. 3D which has a waveform analogous to the waveform of the original input signal, having an instantaneous amplitude proportional to the time that the switching circuit 2 is ON. Accordingly, the signal output level can be varied by regulating the pulse width of the square wave signal. Therefore, the signal output amplified by the low-frequency amplifier is finally reproduced with a level depending upon the output signal from the low-pass filter 4; thus, the sound volume is effectively regulated.

Figure 4:
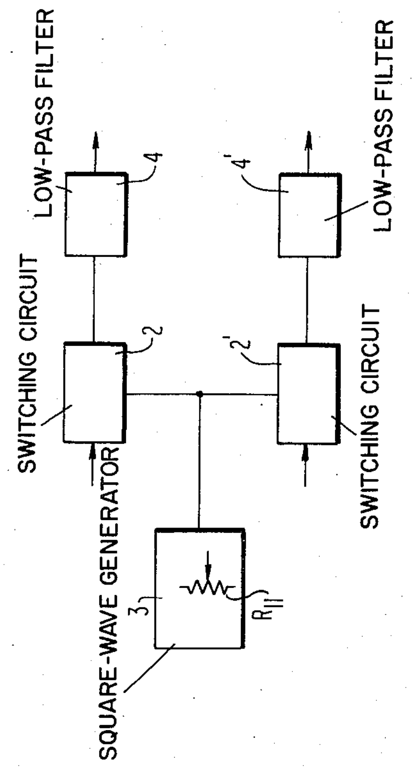
FIG. 4 is a block diagram of a multiple channel system incorporating the present invention.

Now, a system of simultaneously regulating a plurality of input signals by use of the above described circuit will be described with reference to FIG. 4 wherein 3 is a square wave generating circuit, 2 is a switching circuit to which, for example, a right channel signal of a stereophonic reproducer will be applied, and 2′ is another switching circuit to which a left channel signal will be applied. These switching circuits are connected to receive a square wave signal from the square wave generating circuit 3. 4 and 4′ are low-pass filters which function to remove the high frequency components of the square wave from the output signals of the respective switching circuits 2 and 2′.

Thus, if the square wave signal is applied from the square wave generating circuit 3 to the respective switching circuits 2 and 2′ while they are receiving, respectively, the right channel signal and the left channel signal, the right and left channel signals are identically chopped as can be seen from the explanation of the circuit shown in FIGS. 1 and 2. As a result, after passing through the low-pass filters 4 and 4′, signals are obtained having levels proportional to the pulse width of the square wave signal.

It will be appreciated that, though the foregoing embodiment relates to a system with two input signals, the present invention should not be limited to only the two input application, but it can also regulate the sound volume of any number of input signals through employment of switching circuits 2 and low-pass filters 4 wherein the number of switching circuits and filters corresponds to the number of input signals.

Figure 7:
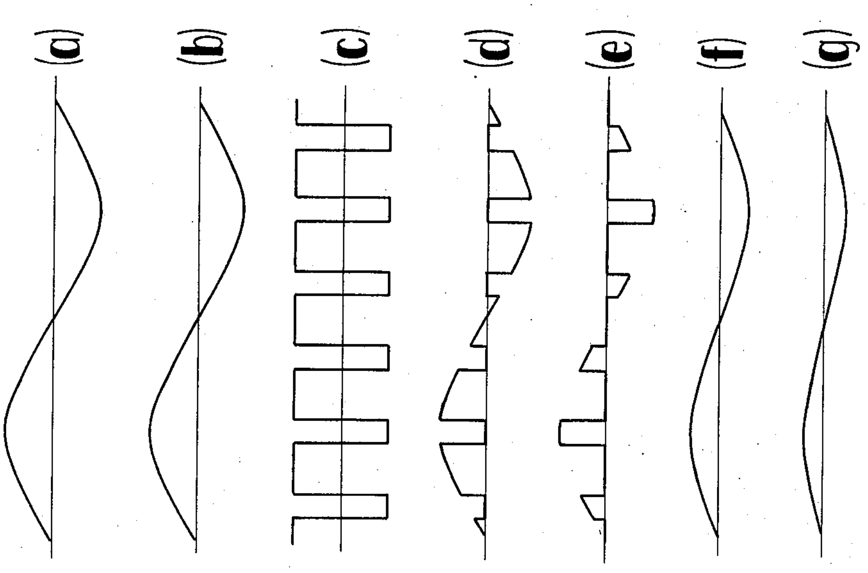
FIGS. 7a-g are signal waveform diagram for a balance control device incorporating the present invention.
Figure 5:
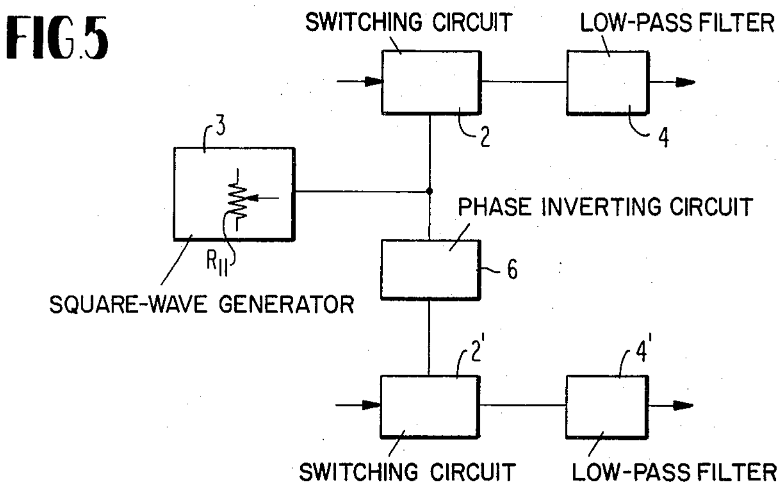
FIG. 5 is a block diagram of a two channel balancing system incorporating the present invention.
Figure 6:
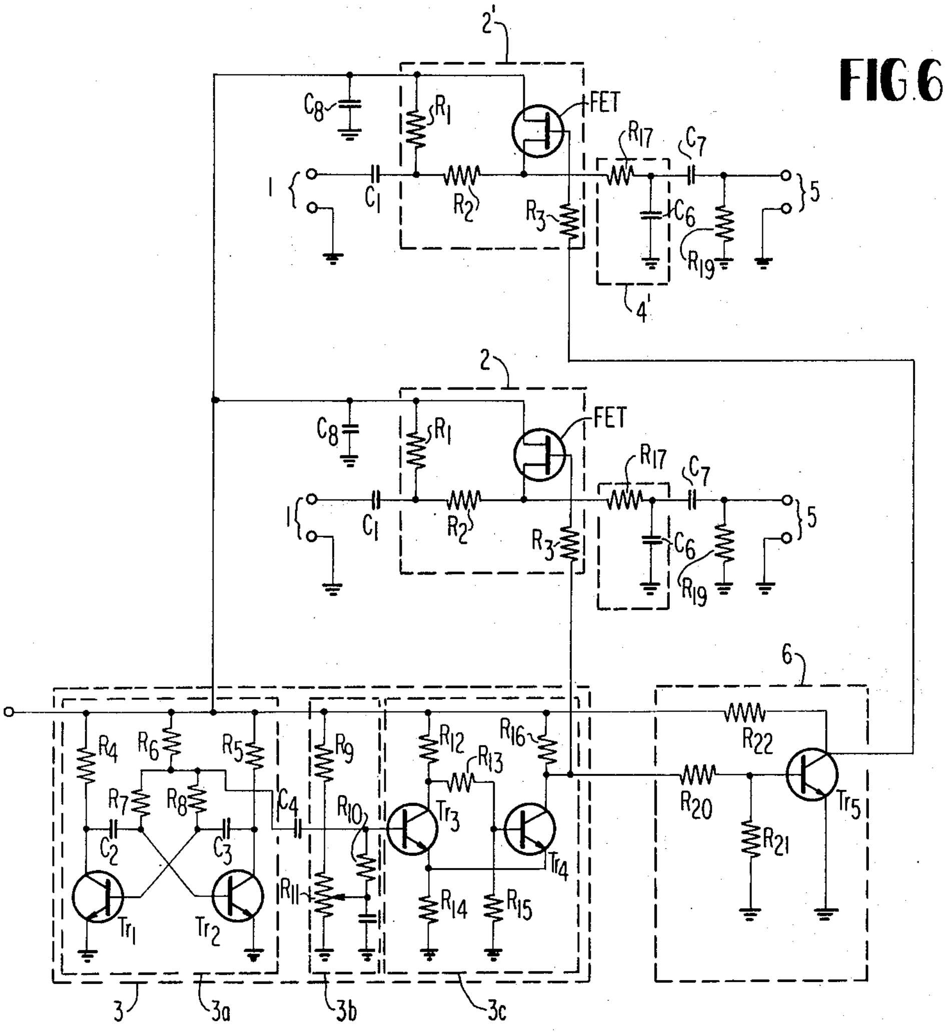
FIG. 6 is a detailed circuit diagram of the two channel balancing system shown in block form in FIG. 5.

In a balance control system shown in FIGS. 5 and 6, a phase inverting circuit 6 is connected between the square wave generating circuit 3 and the switching circuit 2′. Inverter circuit 6 includes resistors $R_{20}$, $R_{21}$ and $R_{22}$ and transistor $Tr_5$. As a result, when signals as shown in FIGS. 7A and 7B are supplied to the respective switching circuits 2 and 2′ and a signal as shown in FIG. 7C is generated by the square wave generating circuit 3, the input signal, shown in FIG. 7A, to the switching circuit 2 is chopped in accordance with the square wave signal and becomes an intermittent signal as shown in FIG. 7D. The input signal, shown in FIG. 7B, to the switching circuit 2′ is chopped in accordance with the square wave signal which is the inverted signal of the square wave signal shown in FIG. 7C and becomes an intermittent signal as shown in FIG. 7E. The respective intermittent signals shown in FIGS. 7D and 7E are filtered by the low-pass filters 4 and 4′, thus removing the frequency components of the square wave. This produces a right channel output signal similar to the signal shown in FIG. 7F and a left channel output signal similar to the signal shown in FIG. 7G. The right and left channel output signals as shown in FIGS. 7F and 7G differ in amplitude wherein the signal shown in FIG. 7F is a larger one. Thus, one can obtain a high-level right channel signal and a low-level left channel signal. In this manner balance control can be achieved. By controlling the variable resistor $R_{11}$ of the pulse width regulating circuit 3*b* in the square wave generating circuit 3, left-right balance condition can be regulated.

In the above described embodiments, if the square waveform signal from the square wave generating circuit 3 is modulated and transmitted through a transmitter and if a receiver for receiving the thus transmitted signal is included in an amplifier means of devices such as radio or television sets, it is possible to achieve cordless remote control.

As described hereinabove, the present invention chops an input signal at a repetition frequency higher than the frequency of the input signal to vary the signal ON time of the chopped signal to thereby regulate the signal level. Thus, noise which may be generated by a variable resistor has no effect upon the signal, in opposition to the conventional systems wherein the signal is directly regulated by the variable resistor. Further, the present invention can simultaneously regulate a plurality of input signals through control of a single variable resistor, so it can be applied to a stereophonic reproducer as well as other sound systems. Furthermore, if two signals are controlled by square wave signals that are mutually out of phase, they can be regulated differently in terms of signal level, so the present invention is also adapted for balance control in the stereophonic apparatus. In addition, if the square wave signal is modulated and transmitted and an associated receiver for receiving the thus transmitted square wave signal is built in an amplifier set, a remote control system can be easily provided.

While the invention has been particularly shown and described with reference to the preferred embodiment thereof, it will be understood by those skilled in the art that various changes in form and details may be made therein without departing from the spirit and scope of the invention.

We claim:

1. A two channel balance control device for regulating the balance condition of input signals in the left and right channels in sound systems, said device comprising:

a. pulse generating means for generating a series of pulses having a frequency greater than the frequency of said input signals, said pulse generating means including control means for varying the width of said pulses;

b. first and second switching circuits for receiving a respective one of said input signals, one of said switching circuits being directly coupled to said pulse generating means and is turned ON by pulses therefrom such that said respective one of said input signals is gated through said one switching circuit when it is ON;

c. an inverter coupled between said pulse generating means and the other of said switching circuits, said other switching circuit being turned ON by the inverted pulses from said pulse generating means such that the corresponding respective one of said input signals is gated through said other switching circuit when it is ON; and d. first and second filter circuits, coupled respectively to said first and second switching circuits, for receiving the gated input signals from said switching means and for filtering the high frequency components from said gated input signals wherein the outputs of said first and second filter circuits are signals having wave shapes which are the same as said input signals and amplitudes proportional to the pulse width of the pulses from said pulse generating means and the variation of said control means causes the amplitude of the output of one filter circuit to increase and the amplitude of the output of the other filter circuit to decrease whereby the outputs of said first and second filter circuits can be balanced.

* * * * *